(12) United States Patent
Rajagopalan et al.

(10) Patent No.: US 11,652,692 B2
(45) Date of Patent: *May 16, 2023

(54) MULTI-FABRIC VLAN CONFIGURATION SYSTEM

(71) Applicant: Dell Products L.P., Round Rock, TX (US)

(72) Inventors: Balaji Rajagopalan, Sunnyvale, CA (US); Joseph Lasalle White, San Jose, CA (US); Pawan Kumar Singal, Milpitas, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,361

(22) Filed: Oct. 13, 2021

(65) Prior Publication Data

US 2022/0038344 A1 Feb. 3, 2022

Related U.S. Application Data

(63) Continuation of application No. 16/946,909, filed on Jul. 10, 2020, now Pat. No. 11,165,650.

(51) Int. Cl.
*H04L 12/24* (2006.01)
*H04L 41/08* (2022.01)
*H04L 41/0806* (2022.01)
*H04L 12/44* (2006.01)
(Continued)

(52) U.S. Cl.
CPC .......... *H04L 41/0886* (2013.01); *H04L 12/44* (2013.01); *H04L 41/0806* (2013.01); *H04L 41/12* (2013.01); *H04L 49/102* (2013.01)

(58) Field of Classification Search
CPC ..... H04L 41/0886; H04L 12/44; H04L 41/12; H04L 49/102; H04L 41/0806
See application file for complete search history.

(56) References Cited

U.S. PATENT DOCUMENTS

| | | |
|---|---|---|
| 9,154,330 B2 | 10/2015 | Hu |
| 9,311,133 B1 | 4/2016 | Nataraja et al. |
| 9,686,817 B2 | 6/2017 | Heo et al. |

(Continued)

FOREIGN PATENT DOCUMENTS

WO    WO 2019091088 A1    5/2019

*Primary Examiner* — Kim T Nguyen
(74) *Attorney, Agent, or Firm* — Joseph Mencher

(57) ABSTRACT

A multi-fabric VLAN configuration system includes a first fabric with server devices that are configured to communicate using VLANs, a primary I/O module coupled to the server devices, and a first fabric management system coupled to the server devices and the primary I/O module. The first fabric management system identifies VLAN information associated with the VLANs, automatically configures the primary I/O module using the VLAN information, and causes the VLAN information to be transmitted by the primary I/O module. A second fabric in the multi-fabric VLAN configuration system includes a leaf switch device that is coupled to the primary I/O module and that receives the VLAN information, and a second fabric management system that is coupled to the leaf switch device and that receives the VLAN information from the leaf switch device, and automatically configures the leaf switch device using the VLAN information.

20 Claims, 7 Drawing Sheets

(51) Int. Cl.
*H04L 41/12* (2022.01)
*H04L 49/102* (2022.01)

(56) References Cited

U.S. PATENT DOCUMENTS

| | | |
|---|---|---|
| 11,165,650 B1* | 11/2021 | Rajagopalan ......... H04L 49/102 |
| 2014/0372576 A1* | 12/2014 | Mohandas ............ H04L 49/354 |
| | | 709/220 |
| 2017/0302476 A1 | 10/2017 | Yang et al. |
| 2020/0036654 A1 | 1/2020 | Annamary et al. |
| 2020/0396181 A1* | 12/2020 | Lochhead ............... H04L 43/08 |
| 2021/0119827 A1 | 4/2021 | Codandam et al. |

* cited by examiner

MULTI-FABRIC VLAN CONFIGURATION SYSTEM

CROSS-REFERENCE TO RELATED APPLICATIONS

The present disclosure is a continuation of U.S. patent application Ser. No. 16/946,909, filed on Jul. 10, 2020, the disclosure of which is incorporated by reference herein in its entirety.

BACKGROUND

The present disclosure relates generally to information handling systems, and more particularly to configuring information handling system communications via Virtual Local Area Networks (VLANs) across multiple fabrics/domains.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, Input/Output (I/O) modules, and switch devices, are sometime provided across different fabrics while being utilized to transmit communications between those fabrics. For example, a first fabric may include primary I/O modules connected via secondary I/O modules to server devices, while a second fabric may include leaf switch devices connected to spine switch devices as well as, in some cases, an Internet connection device such as a router device. Furthermore, the first fabric and the second fabric may be connected via the coupling of the primary I/O modules in the first fabric and the leaf switch devices in the second fabric in order to allow the server devices to communicate with each other and, in some cases, over the Internet. For example, the multi-fabric configuration discussed above may allow a first server device connected via a first secondary I/O module to a first primary I/O module to communicate through the Internet via an Internet device connected to one of the leaf switch device, or with a second server device connected via a second secondary I/O module to a second primary I/O module via a spine switch device and leaf switch device(s).

However, communications via multi-fabric configurations like those discussed above require extensive manual configuration operations to be performed on the primary I/O modules and the leaf switch devices. For example, each server device may be configured to utilize Virtual Local Area Networks (VLANs) for its communications, and the secondary I/O modules allow a relatively large number of server devices to be connected to any particular primary I/O module. As such, the communications discussed above require a network administrator or other user to configure the primary I/O modules and the leaf switch devices discussed above with VLAN information corresponding to multiple hundreds of VLANs in order to enable server device communications, which is a time-consuming and error-prone process.

Accordingly, it would be desirable to provide a multi-fabric VLAN configuration system that addressees the issues discussed above.

SUMMARY

According to one embodiment, an Information Handling System (IHS) includes a processing system; and a memory system that is coupled to the processing system and that includes instructions that, when executed by the processing system, cause the processing system to provide a fabric management engine that is configured to: receive, from a leaf switch device in a first fabric that is coupled to a primary Input/Output (I/O) module in a second fabric, Virtual Local Area Network (VLAN) information associated with a plurality of VLANs that are utilized by a plurality of server devices coupled to the primary I/O module; and automatically configure a plurality of leaf switch device downlink ports on the leaf switch device using the VLAN information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
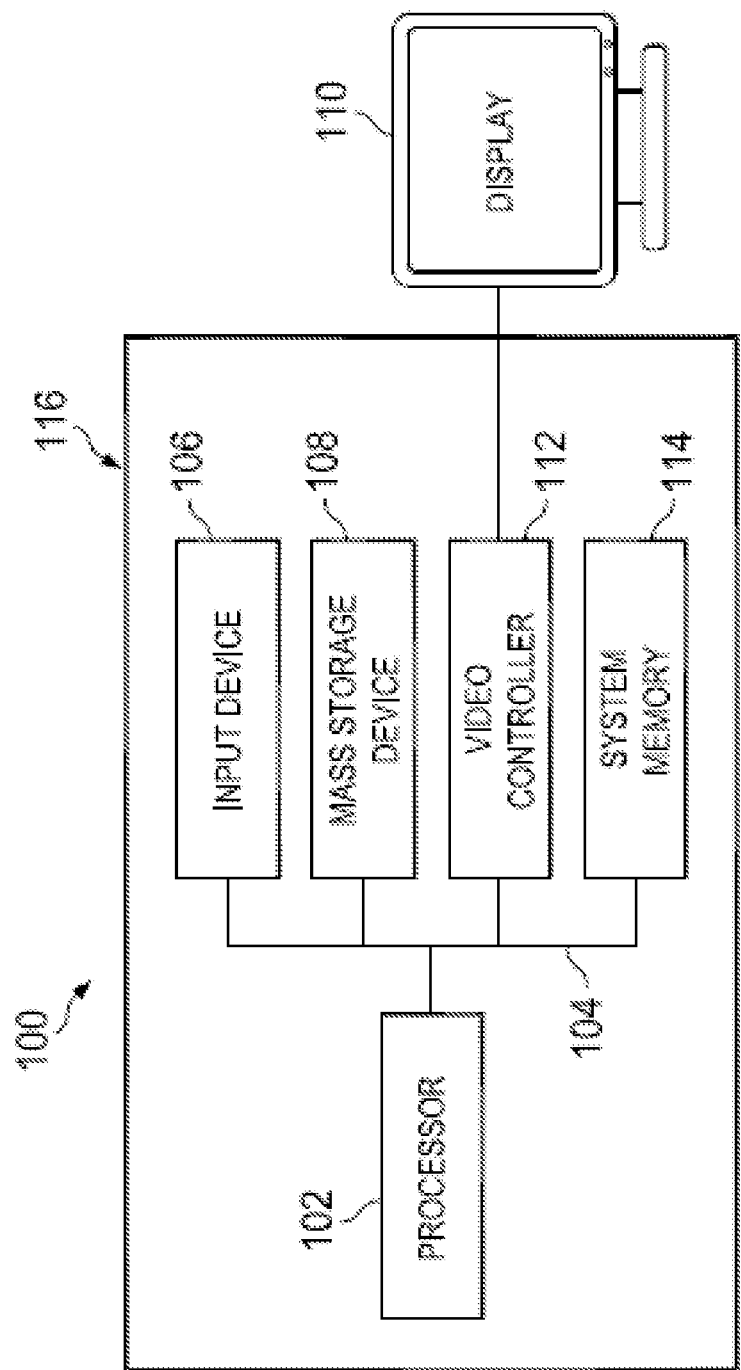
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a multi-fabric VLAN configuration system 200 is illustrated. In the illustrated embodiment, the multi-fabric VLAN configuration system 200 includes a fabric 202 that includes a plurality of primary Input/Output (I/O) modules 204a, 204b, 204c, and 204d. In an embodiment, any or all of the primary I/O modules 204a-204d may be provided by the IHS 100 discussed above with reference to FIG. 1, and/or may include some or all of the components of the IHS 100. In a specific example, any or all of the primary I/O modules 204a-204d may be provided by a DELL® EMC® networking MX9116n fabric switching engine switch device, available from DELL® Inc. of Round Rock, Tex., United States. One of skill in the art in possession of the present disclosure will appreciate that the primary I/O modules 204a-204d may be provided by "full-function" I/O modules that include an operating system and that may be configured to perform any of a variety of I/O module functions known in the art in handling server device communications, discussed in further detail below, and in specific examples may include networking hardware providing networking functions capable of supporting the secondary I/O modules discussed below that are coupled to them via double-density connections. However, while illustrated and discussed as being provided by particular type/functionality I/O modules, one of skill in the art in possession of the present disclosure will recognize that the multi-fabric VLAN configuration system 200 may include any devices that may be configured to operate similarly as the primary I/O modules 204a-204d discussed below.

In the illustrated embodiment, the fabric 202 in the multi-fabric VLAN configuration system 200 also includes one or more secondary I/O modules 206a coupled to the primary I/O module 204a, one or more secondary I/O modules 206b coupled to the primary I/O module 204b, one or more secondary I/O modules 206c coupled to the primary I/O module 204c, and one or more secondary I/O modules 206d coupled to the primary I/O module 204d. For example, each secondary I/O module may be coupled to one of the primary I/O modules 204a-204d via an aggregated link (e.g., a VLT port channel in the VLT protocol), and one of skill in the art in possession of the present disclosure will appreciate that each primary I/O module 204a-204d may typically be coupled to between 1-9 secondary I/O modules, while being capable of coupling to up to 12 secondary I/O modules. In an embodiment, any or all of the secondary I/O modules 206a-206d may be provided by the IHS 100 discussed above with reference to FIG. 1, and/or may include some or all of the components of the IHS 100. In a specific example, any or all of the secondary I/O modules 206a-206d may be provided by a DELL® MX7108 expander module, available from DELL® Inc. of Round Rock, Tex., United States. One of skill in the art in possession of the present disclosure will appreciate that the secondary I/O modules 206a-206d may be provided to enable their connected primary I/O module to couple to additional server devices (discussed in further detail below) and, as such, may not include an operating system, and may not be configured to perform many (or all of) the variety of I/O module functions performed by the primary I/O modules 204a-204d, discussed in further detail below, and in specific examples may and electrical pass-through device connected via double-density connections to the primary I/O modules discussed above. However, while illustrated and discussed as being provided by a particular type/functionality I/O modules, one of skill in the art in possession of the present disclosure will recognize that the multi-fabric VLAN configuration system 200 may include any devices that may be configured to operate similarly as the secondary I/O modules 206a-206d discussed below.

Figure 2A:
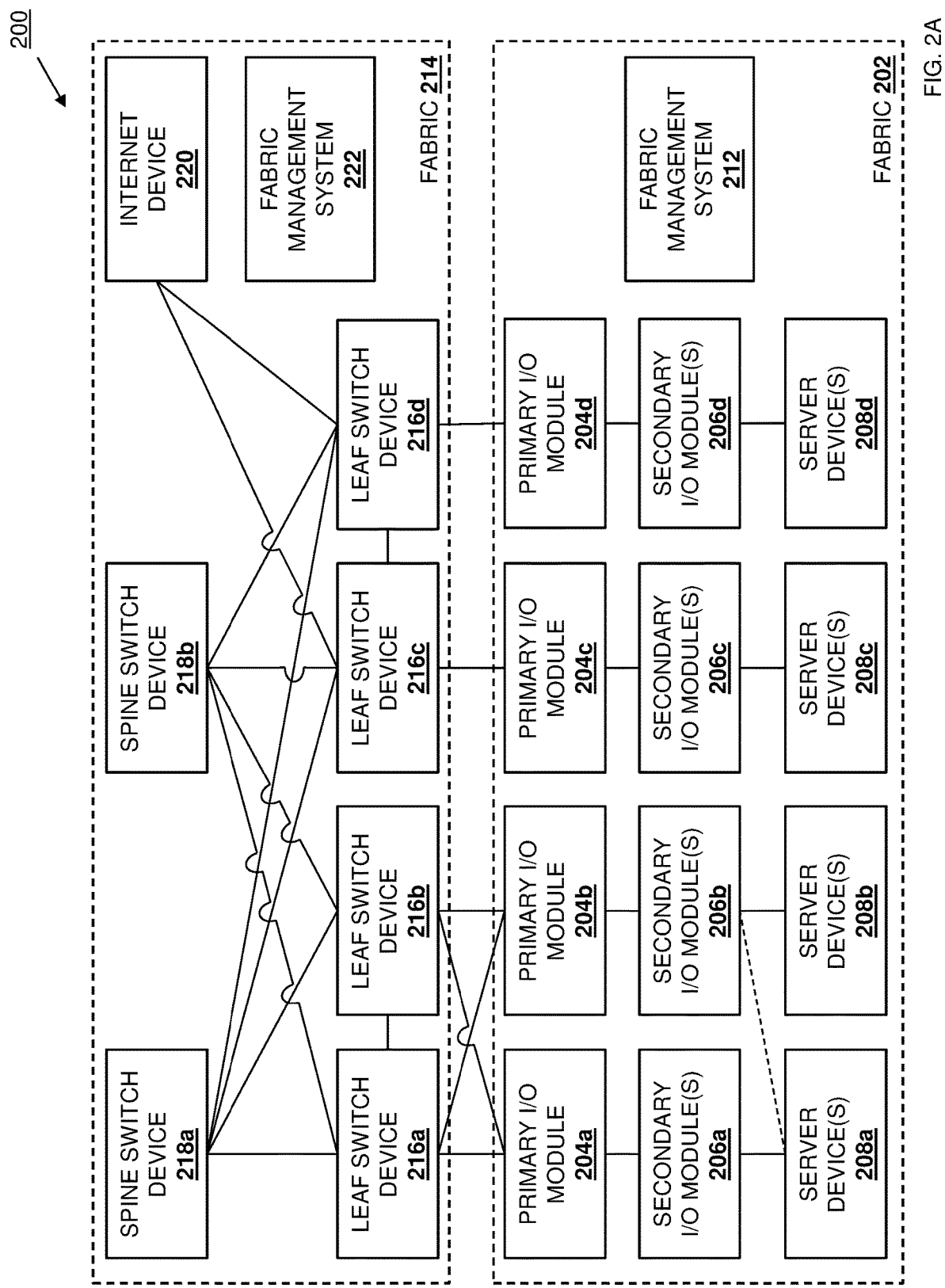
FIG. 2A is a schematic view illustrating an embodiment of a multi-fabric VLAN configuration system.

In the illustrated embodiment, the fabric 202 in the multi-fabric VLAN configuration system 200 also includes one or more server devices 208a coupled to one or more of the secondary I/O modules 206a, one or more server devices 208b coupled to one or more of the secondary I/O modules 206b, one or more server devices 208c coupled to one or more of the secondary I/O modules 206c, and one or more server devices 208d coupled to one or more of the secondary I/O modules 204d. Furthermore, FIG. 2A illustrates how server devices may be coupled to multiple secondary I/O modules in the fabric 202 (e.g., via the dashed line between the server device(s) 208a and the secondary I/O module(s) 206b, which one of skill in the art in possession of the present disclosure will appreciate may be provided using Link Aggregation Control Protocol (LACP) bonding techniques). In an embodiment, any or all of the server devices 208a-208d may be provided by the IHS 100 discussed above with reference to FIG. 1, and/or may include some or all of the components of the IHS 100. However, while illustrated and discussed as being provided by server devices, one of skill in the art in possession of the present disclosure will recognize that the multi-fabric VLAN configuration system 200 may include any devices that may be configured to operate similarly as the server devices 208a-208d discussed below.

As will be appreciated by one of skill in the art in possession of the present disclosure, in a specific example, each pair of the primary I/O modules (e.g., the pair of primary I/O modules 204a/204b, the pair of primary I/O modules 204c/204d, etc.) may be provided in a respective rack chassis (e.g., a "primary I/O module rack chassis") such that each primary I/O module rack chassis houses two primary I/O modules. Furthermore, while not illustrated or described herein, each primary I/O module rack chassis that houses a pair of primary I/O modules may also house server devices that are directly connected to those primary I/O modules. However, one of skill in the art in possession of the present disclosure will recognize that each primary I/O module rack chassis may be limited to housing a maximum number of server devices (e.g., 8 server devices in many conventional rack chassis), while each of the primary I/O modules may be configured to handle communications from many more server devices.

Furthermore, each secondary I/O module may be provided in a respective rack chassis (e.g., a "secondary I/O module rack chassis") with a subset of the server devices 208a-208d (e.g., 8 server devices in each rack chassis) that are connected to that secondary I/O module, and each secondary I/O module is connected to one of the primary I/O modules (which is housed in primary I/O module rack chassis) in order to couple the server devices in its secondary I/O module rack chassis to a primary I/O module. As discussed above, the primary I/O module may be a "full-function" I/O module that includes an operating system and that may be configured to perform a variety of I/O module functions for any server device (e.g., that is directly connected to that primary I/O module, or that is coupled to that primary I/O module by a secondary I/O module), while the secondary I/O modules do not include an operating system and are not configured to perform many (or all) of the variety of I/O module functions, as the purpose of the secondary I/O modules is to simply connect primary I/O modules to additional server devices that are not located in its primary I/O module rack chassis.

Figure 2B:
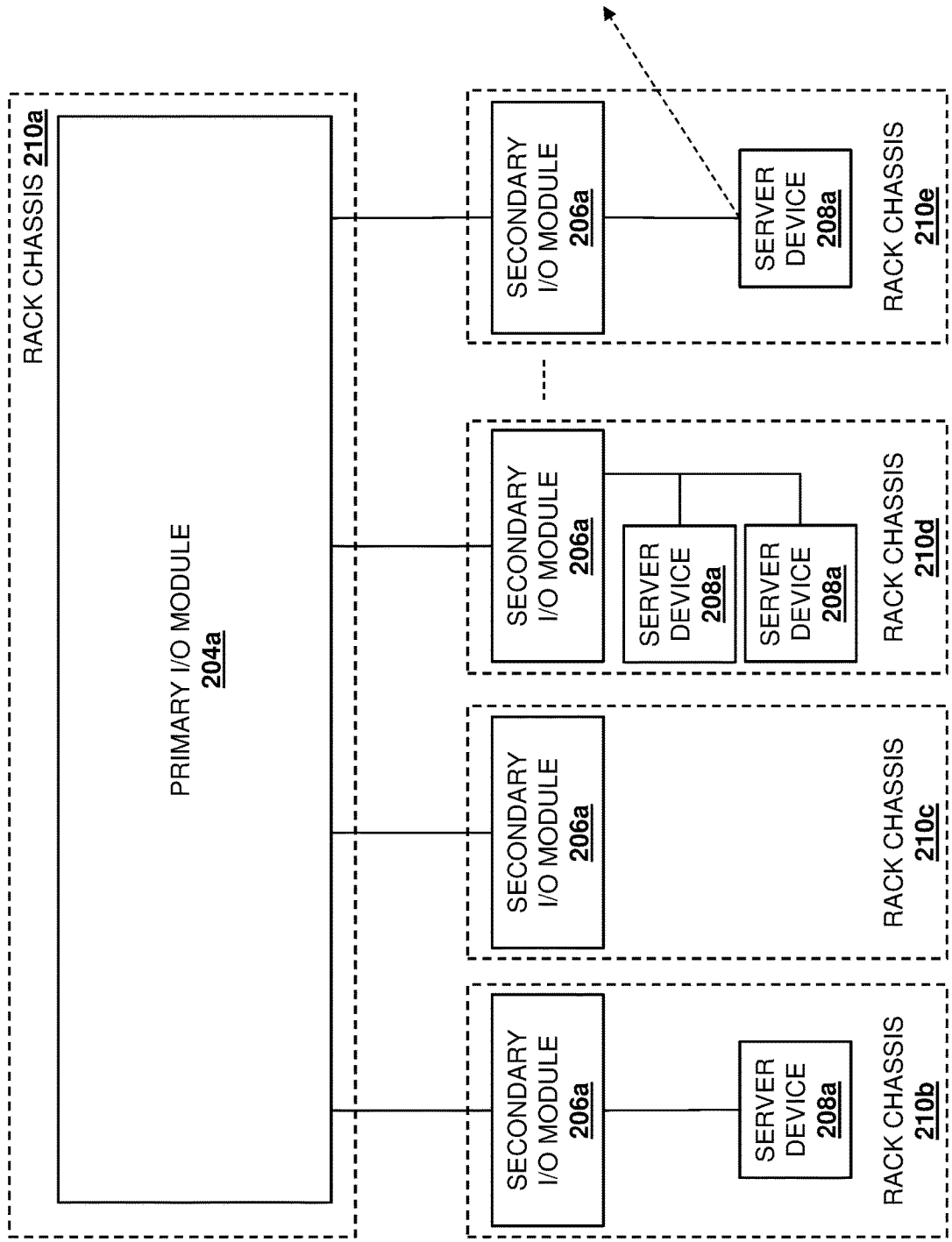
FIG. 2B is a schematic view illustrating an embodiment of a portion of the multi-fabric VLAN configuration system of FIG. 2A.

With reference to FIG. 2B, the primary I/O module 204a is illustrated as included in a rack chassis 210a and, while not illustrated, as discussed above the rack chassis 210a may house the primary I/O module 204b and server devices directly connected to that primary I/O module 204a while remaining within the scope of the present disclosure as well. Furthermore, a rack chassis 210b may house a secondary I/O module 206a and a server device 208a, and the secondary I/O module 206a may couple the server device 210a to the primary I/O module 204a via a link between the primary I/O module 204a and that secondary I/O module 206a (e.g., using a "double density" connection or other high bandwidth connection known in the art). Similarly, a rack chassis 210bc may house a secondary I/O module 206a that does not couple any server devices to the primary I/O module 204a. Similarly as well, a rack chassis 210d may house a secondary I/O module 206a and a pair of server devices 208a, and the secondary I/O module 206a may couple the server devices 210a to the primary I/O module 204a via a link between the primary I/O module 204a and that secondary I/O module 206a (e.g., using a "double density" connections or other high bandwidth connections known in the art).

Similarly as well, a rack chassis 210e may house a secondary I/O module 206a and a server device 208a, and the secondary I/O module 206a may couple the server device 210a to the primary I/O module 204a via a link between the primary I/O module 204a and that secondary I/O module 206a (e.g., using a "double density" connections or other high bandwidth connections known in the art). FIG. 2B also illustrates how the server device 208a may be coupled to another secondary I/O module (e.g., one of the secondary I/O module(s) 206b in another rack chassis) as well. As will be appreciated by one of skill in the art in possession of the present disclosure, variations of the configuration illustrated in FIG. 2B may be provided for combinations of the primary I/O modules, secondary I/O modules, and server devices illustrated in FIG. 2A. For example, while only a few server devices are illustrated as coupled to the primary I/O module 204a via the secondary I/O modules 206a in FIG. 2B, as discussed above primary I/O modules may be coupled to as many as 9-12 secondary I/O modules, which are in turn coupled to up to 8 server devices and, as such, many more server devices than are illustrated in FIG. 2B may be coupled to any primary I/O modules while remaining within the scope of the present disclosure as well.

In the illustrated embodiment, the fabric 202 in the multi-fabric VLAN configuration system 200 also includes a fabric management system 212 that, while not illustrated in FIG. 2A, may be coupled to any or all of the primary I/O modules 204a-204d, the secondary I/O modules 206a-206d, and/or the server devices 208a-208d. In an embodiment, the fabric management system 212 may be provided by the IHS 100 discussed above with reference to FIG. 1, and/or may include some or all of the components of the IHS 100. In a specific example, the fabric management system 212 may be provided by a Smart Fabric Services (SFS) fabric management system available in operating systems (e.g., the next generation Operating System 10 (OS10) provided by DELL® Inc. of Round Rock, Tex., United States), and may be configured to perform a variety of fabric management operations for the primary I/O modules 204a-204d, the secondary I/O modules 206a-206d, and/or the server devices 208a-208d in the fabric 202, which may provide an SFS domain of the SFS management system. However, while illustrated and discussed as being provided by a particular fabric management system, one of skill in the art in possession of the present disclosure will recognize that the multi-fabric VLAN configuration system 200 may include any devices that may be configured to operate similarly as the fabric management system 212 discussed below.

In the illustrated embodiment, the multi-fabric VLAN configuration system 200 also includes a fabric 214 having a plurality of leaf switch devices 216a, 216b, 216c, and 216d. In an embodiment, any or all of the leaf switch devices 216a-216d may be provided by the IHS 100 discussed above with reference to FIG. 1, and/or may include some or all of the components of the IHS 100, and in specific examples may be provided by Top Of Rack (TOR) switch devices. However, while illustrated and discussed as being provided by TOR switch devices, one of skill in the art in possession of the present disclosure will recognize that the multi-fabric VLAN configuration system 200 may include any devices that may be configured to operate similarly as the leaf switch devices 216a-216d discussed below. In the illustrated embodiment, pairs of leaf switch devices (e.g., the leaf switch devices 216a/216b and the leaf switch devices 216c/216d) may be coupled together by inter-switch links that may be provided by aggregated Inter-Chassis Links (ICLs) (also referred to as VLT interconnects (VLTi's) in the VLT protocol), and/or other inter-switch connections that would be apparent to one of skill in the art in possession of the present disclosure.

In the example illustrated in FIG. 2A, the leaf switch device 216a is coupled to each of the primary I/O modules 204a and 204b, the leaf switch device 216b is coupled to each of the primary I/O modules 204a and 204b, and one of skill in the art in possession of the present disclosure will recognize that the connections between the leaf switch devices 216a/216b and the primary I/O modules 204a/204b may be aggregated using, for example, the Virtual Link Trunking (VLT) protocol available in switch devices provided by DELL® Inc. of Round Rock, Tex., United States, in order to provide an aggregated link (or "VLT port channel") between the leaf switch devices 216a/216b and the primary I/O modules 204a/204b. Similarly, the leaf switch device 216c is coupled to the primary I/O module 204c, the leaf switch device 216d is coupled to the primary I/O module 204d, and one of skill in the art in possession of the present disclosure will recognize that the connections between the leaf switch device 216c and the primary I/O module 204c, as well as the leaf switch device 216d and the primary I/O module 204d, may each be aggregated using, for example, the VLT protocol available in switch devices provided by DELL® Inc. of Round Rock, Tex., United States, in order to provide an aggregated link (or "VLT port channel") between the leaf switch device 216c and the primary I/O module 204c, as well as the leaf switch device 216d and the primary I/O module 204d. As such, the fabric 202 may be connected to the fabric 214 via uplink ports (discussed in further detail below) on the primary I/O modules 204a-204d.

In the illustrated embodiment, the fabric 214 in the multi-fabric VLAN configuration system 200 also includes a pair of spine switch devices 218a and 218b, with the spine switch device 218a coupled to each of the leaf switch devices 216a, 216b, 216c, and 216d, and the spine switch device 218b coupled to each of the leaf switch devices 216a, 216b, 216c, and 216d as well. As will be appreciated by one of skill in the art in possession of the present disclosure, any connection between either of the spine switch devices 218a/218b and a leaf switch device 216a-216d may include one or more links that may be aggregated similarly as discussed above. In an embodiment, either or both of the spine switch devices 218a and 218b may be provided by the IHS 100 discussed above with reference to FIG. 1, and/or may include some or all of the components of the IHS 100. However, while illustrated and discussed as being provided by spine switch devices, one of skill in the art in possession of the present disclosure will recognize that the multi-fabric VLAN configuration system 200 may include any devices that may be configured to operate similarly as the spine switch devices 218a and 218b discussed below.

In the illustrated embodiment, the fabric 214 in the multi-fabric VLAN configuration system 200 also includes an Internet device 220 that is connected to each of the leaf switch devices 216c and 216d, as well as to the Internet (not explicitly illustrated in FIG. 2A). In an embodiment, the Internet device 220 may be provided by the IHS 100 discussed above with reference to FIG. 1, and/or may include some or all of the components of the IHS 100, and in specific examples may be provided by a router device. However, while illustrated and discussed as being provided by a router device, one of skill in the art in possession of the present disclosure will recognize that the multi-fabric VLAN configuration system 200 may include any devices that may be configured to operate similarly as the Internet device 220 discussed below.

In the illustrated embodiment, the fabric 214 in the multi-fabric VLAN configuration system 200 also includes a fabric management system 222 that, while not illustrated in FIG. 2A, may be coupled to any or all of the leaf switch devices 216a-216d, the spine switch devices 218a and 218b, and the Internet device 220. In an embodiment, the fabric management system 222 may be provided by the IHS 100 discussed above with reference to FIG. 1, and/or may include some or all of the components of the IHS 100. In a specific example, the fabric management system 222 may be provided by a Smart Fabric Services (SFS) fabric management system available in operating systems (e.g., the next generation Operating System 10 (OS10) provided by DELL® Inc. of Round Rock, Tex., United States), and may be configured to perform a variety of fabric management operations for the leaf switch devices 216a-216d, the spine switch devices 218a and 218b, and the Internet device 220 in the fabric 214, which provides an SFS domain of the SFS management system. However, while illustrated and discussed as being provided by a particular fabric management system, one of skill in the art in possession of the present disclosure will recognize that the multi-fabric VLAN configuration system 200 may include any devices that may be configured to operate similarly as the fabric management system 222 discussed below. However, while a specific multi-fabric VLAN configuration system 200 has been illustrated and described, one of skill in the art in possession of the present disclosure will recognize that the multi-fabric VLAN configuration system of the present disclosure may include a variety of components and component configurations while remaining within the scope of the present disclosure as well.

Figure 3:
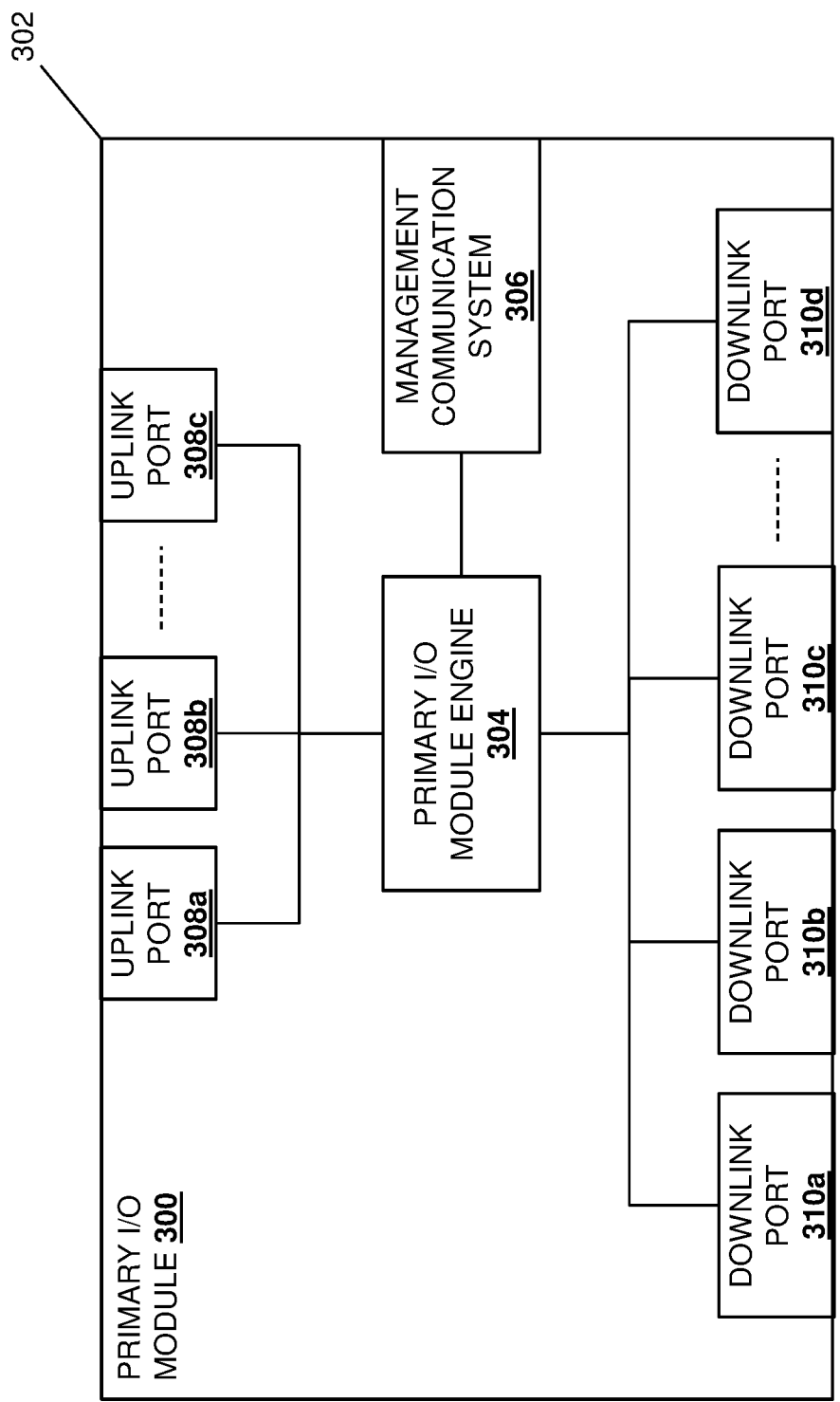
FIG. 3 is a schematic view illustrating an embodiment of a primary I/O module included in the multi-fabric VLAN configuration system of FIGS. 2A and 2B.

Referring now to FIG. 3, an embodiment of a primary I/O module 300 is illustrated that may provide any or all of the primary I/O modules 204a-204d discussed above with reference to FIG. 2. As such, the primary I/O module 300 may be provided by the IHS 100 discussed above with reference to FIG. 1 and/or may include some or all of the components of the IHS 100, and in specific examples may be provided by a DELL® EMC® networking MX9116n fabric switching engine switch device, available from DELL® Inc. of Round Rock, Tex., United States. Furthermore, while illustrated and discussed as a particular primary I/O module, one of skill in the art in possession of the present disclosure will recognize that the functionality of the primary I/O module 300 discussed below may be provided by other devices that are configured to operate similarly as the primary I/O module 300 discussed below. In the illustrated embodiment, the primary I/O module 300 includes a chassis 302 that houses the components of the primary I/O module 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a primary I/O module engine 304 that is configured to perform the functionality of the primary I/O module engines and/or primary I/O modules discussed below.

The chassis 302 may also house a management communication system 306 that is coupled to the primary I/O module engine 304 (e.g., via a coupling between the management communication system 306 and the processing system), that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure, and that couples the primary I/O module 300 to the fabric management system 212 in the examples provided herein. In addition, the chassis 302 may include a plurality of uplink ports 308a, 308b, and up to 308c that, as discussed below, may couple the primary I/O module to any of the leaf switch devices 216a-216d. Furthermore, the chassis 302 may also include a plurality of downlink ports 310a, 310b, 310c, and up to 310d that, as discussed below, may couple the primary I/O module 300 to any of the secondary I/O modules 206a-206d. However, while a specific primary I/O module 300 has been illustrated, one of skill in the art in possession of the present disclosure will recognize that primary I/O modules (or other devices operating according to the teachings of the present disclosure in a manner similar to that described below for the primary I/O module 300) may include a variety of components and/or component configurations for providing conventional primary I/O module functionality, as well as the functionality discussed below, while remaining within the scope of the present disclosure as well.

Figure 4:
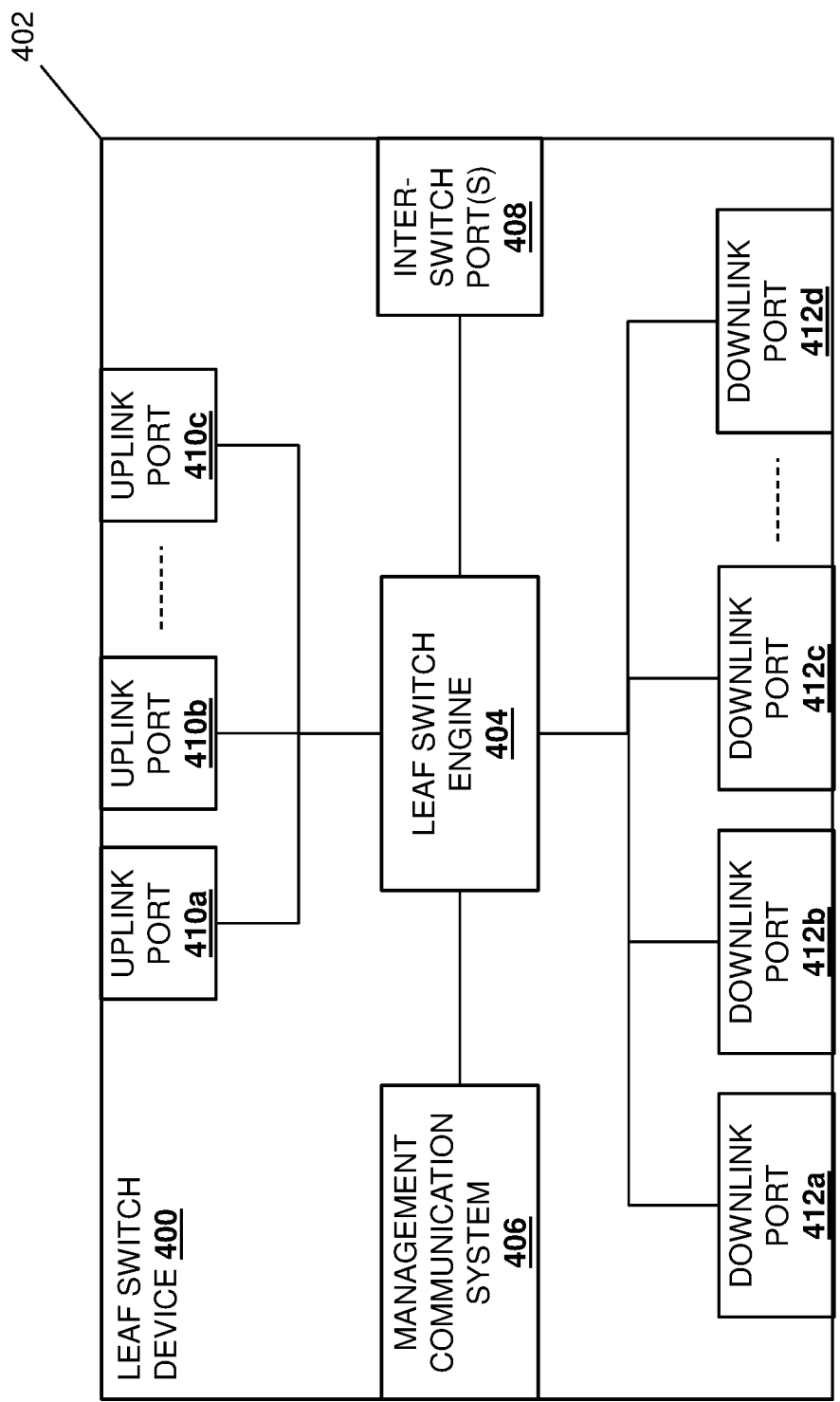
FIG. 4 is a schematic view illustrating an embodiment of a leaf switch device included in the multi-fabric VLAN configuration system of FIGS. 2A and 2B.

Referring now to FIG. 4, an embodiment of a leaf switch device 400 is illustrated that may provide any or all of the leaf switch devices 216a-216d discussed above with reference to FIG. 2. As such, the leaf switch device 400 may be provided by the IHS 100 discussed above with reference to FIG. 1 and/or may include some or all of the components of the IHS 100, and in specific examples may be provided by TOR switch device. However, while illustrated and discussed as a TOR switch device, one of skill in the art in possession of the present disclosure will recognize that the functionality of the leaf switch device 400 discussed below may be provided by other devices that are configured to operate similarly as the leaf switch device 400 discussed below. In the illustrated embodiment, the leaf switch device 400 includes a chassis 402 that houses the components of the leaf switch device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a leaf switch engine 404 that is configured to perform the functionality of the leaf switch engines and/or leaf switch devices discussed below.

The chassis 402 may also house a management communication system 406 that is coupled to the leaf switch engine 404 (e.g., via a coupling between the management communication system 406 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure, and that couples the leaf switch device 400 to the fabric management system 222 in the examples provided herein. In addition, the chassis 402 may include one or more inter-switch ports 408 that may couple the leaf switch device 400 to other leaf switch devices, as discussed above. Furthermore, the chassis may also include a plurality of uplink ports 410a, 410b, and up to 410c that, as discussed below, may couple the leaf switch device 400 to any of the spine switch devices 218a and 218b. Further still, the chassis 402 may also include a plurality of downlink ports 412a, 412b, 412c, and up to 412d that, as discussed below, may couple the leaf switch device 400 to any of the primary I/O modules 204a-204d. However, while a specific leaf switch device 400 has been illustrated, one of skill in the art in possession of the present disclosure will recognize that leaf switch devices (or other devices operating according to the teachings of the present disclosure in a manner similar to that described below for the leaf switch device 400) may include a variety of components and/or component configurations for providing conventional leaf switch device functionality, as well as the functionality discussed below, while remaining within the scope of the present disclosure as well.

Figure 5:
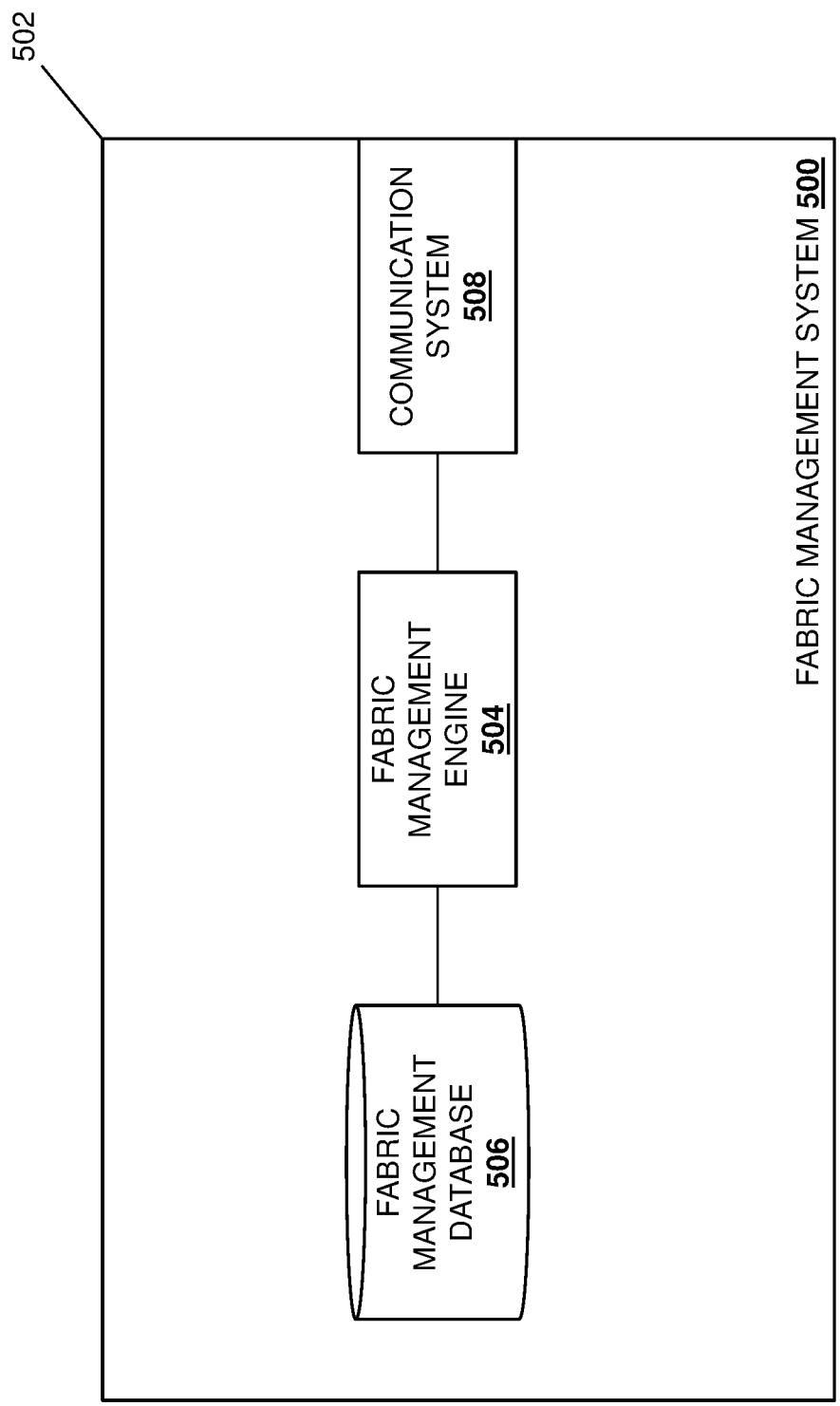
FIG. 5 is a schematic view illustrating an embodiment of a fabric management system included in the multi-fabric VLAN configuration system of FIGS. 2A and 2B.

Referring now to FIG. 5, an embodiment of a fabric management system 500 is illustrated that may provide either or both of the fabric management systems 212 and 222 discussed above with reference to FIG. 2. As such, the fabric management system 500 may be provided by the IHS 100 discussed above with reference to FIG. 1 and/or may include some or all of the components of the IHS 100, and in specific examples may be provided by an SFS fabric management system available from DELL® Inc. of Round Rock, Tex., United States. Furthermore, while illustrated and discussed as a particular fabric management system, one of skill in the art in possession of the present disclosure will recognize that the functionality of the fabric management system 500 discussed below may be provided by other devices that are configured to operate similarly as the fabric management system 500 discussed below. In the illustrated embodiment, the fabric management system 500 includes a chassis 502 that houses the components of the fabric management system 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric management engine 504 that is configured to perform the functionality of the fabric management engines and/or fabric management systems discussed below.

The chassis 502 may also house a storage device (not illustrated, but which may include the storage device 108 discussed above with reference to FIG. 1) that is coupled to the fabric management engine 504 (e.g., via a coupling between the storage device and the processing system) and that provides a fabric management database 506 that may store any of the information utilized by the fabric management engine 504 discussed below. The chassis 502 may also house a communication system 508 that is coupled to the fabric management engine 504 (e.g., via a coupling between the communication system 508 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific fabric management system 500 has been illustrated, one of skill in the art in possession of the present disclosure will recognize that fabric management systems (or other devices operating according to the teachings of the present disclosure in a manner similar to that described below for the fabric management system) may include a variety of components and/or component configurations for providing conventional fabric management system functionality, as well as the functionality discussed below, while remaining within the scope of the present disclosure as well.

Figure 6:
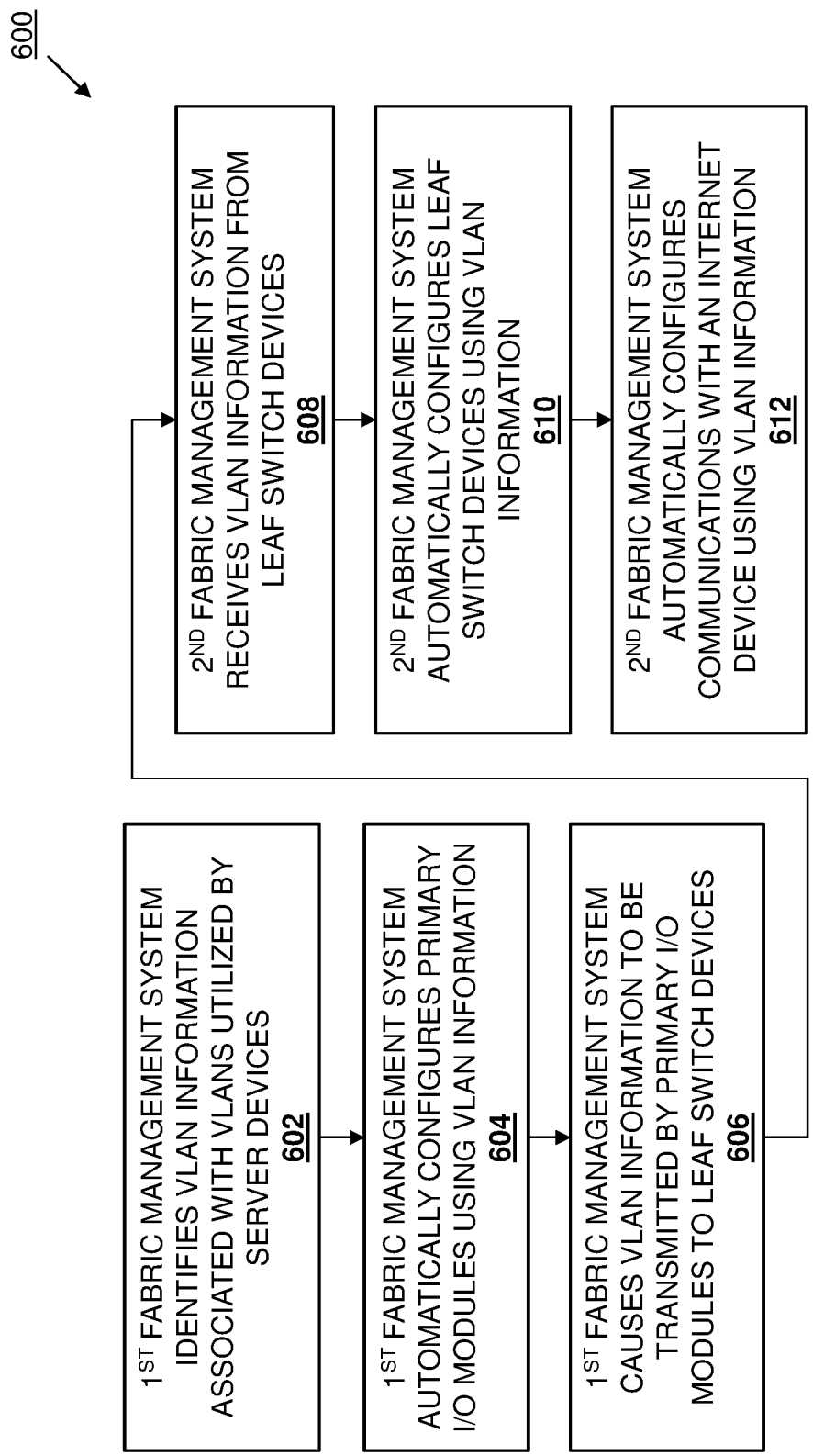
FIG. 6 is a flow chart illustrating an embodiment of a method for configuring server device communication via VLANs across multiple fabrics.

Referring now to FIG. 6, an embodiment of a method 600 for configuring server device communication via VLANs across multiple fabrics is illustrated. As discussed below, the systems and methods of the present disclosure provide for the automatic configuration of server device communications via VLANs and across multiple fabrics to enable server devices to communicate between each other and via the Internet. For example, the multi-fabric VLAN configuration system of the present disclosure includes a first fabric having a plurality of server devices that are configured to communicate using a plurality of VLANs, a primary I/O module that is coupled to the plurality of server devices, and a first fabric management system that is coupled to the plurality of server devices and the primary I/O module. The first fabric management system operates to identify VLAN information associated with the plurality of VLANs, automatically configure a plurality of primary I/O module downlink ports on the primary I/O module using the VLAN information, and cause the VLAN information to be transmitted via a plurality of primary I/O module uplink ports on the primary I/O module. The multi-fabric VLAN configuration system of the present disclosure also includes a second fabric having a leaf switch device that is coupled to the primary I/O module via the plurality of primary I/O module uplink ports and that is configured to receive the VLAN information, and a second fabric management system that is coupled to the leaf switch device. The second fabric management system operates to receive the VLAN information from the leaf switch device, and automatically configure a plurality of leaf switch device downlink ports on the leaf switch device using the VLAN information. As such, the multi-fabric VLAN configuration system of the present disclosure eliminates the time consuming, error-prone conventional manual configuration techniques to allow server device communication using VLANs and across multiple fabrics.

The method 600 begins at block 602 where a first fabric management system identifies VLAN information associated with VLANs utilized by server devices to communicate. In an embodiment, during or prior to the method 600, the multi-fabric VLAN configuration system 200 may be configured by, for example, physically coupling together the server devices 208*a*-208*d*, the secondary I/O modules 206*a*-206*d*, the primary I/O modules 204*a*-204*d*, the leaf switch devices 216*a*-216*d*, the spine switch devices 218*a* and 218*b*, the Internet device 220, and the fabric management devices 212 and 222 (e.g., using cabling and/or other coupling techniques known in the art) in order to provide the fabrics 202 and 214 discussed above. Furthermore, during or prior to the method 600, the server devices 208*a*-208*d* may also be configured to communicate using VLANs, and one of skill in the art in possession of the present disclosure will recognize how a network administrator or other user of the multi-fabric VLAN configuration system 200 may utilize a variety of VLAN configuration techniques known in the art in order to configure each of the server device 208*a*-208*d* to communicate using one or more of the VLANs discussed below. As such, prior to block 602, each of the server devices 208*a* in the fabric 202 is configured to communicate using at least one VLAN. Furthermore, one of skill in the art in possession of the present disclosure will appreciate that other systems may integrate with the system of the present disclosure, and the configuration of the VLAN by a user at block 602 may allow that VLAN configuration to be propagated to multiple systems while remaining within the scope of the present disclosure.

In an embodiment, at block 602, the fabric management engine 504 in the fabric management system 212/500 may communicate via its communication system 508 with the primary I/O module engine 304 in the primary I/O modules 204*a*-204*d*/300 (e.g., via their respective management communication systems 306) in order to identify VLAN information associated with the VLANs that the server devices 208*a*-208*d* are configured to use to communicate. For example, as discussed above, each of the primary I/O modules 204*a*-204*d*/300 may be coupled via one or more of its downlink ports 310*a*-310*d* ("server facing downlink ports") using aggregated links (e.g., VLT port channels in the VLT protocol) to secondary I/O modules 206*a*-206*d* that are further coupled to the server devices 208*a*-208*d*, and VLANs configured for use by the server devices 208*a*-208*d* in order to communicate may be visible via those downlink ports 310*a*-310*d* (e.g., via the VLT port channels), which allows the VLAN information associated with those VLANs to be identified by the fabric management engine 504 in the fabric management system 212/500 at block 602.

As such, with reference to the specific example illustrated in FIG. 2B, at block 602 the fabric management engine 504 in the fabric management system 212/500 may identify first VLAN information associated with a first VLAN that the server device 208*a* in the rack chassis 210*b* is configured to utilize to communicate, second and third VLAN information associated with second and third VLANs that the respective server devices 208*a* in the rack chassis 210*d* are configured to utilize to communicate, and fourth VLAN information associated with a fourth VLAN that the server device 208*a* in the rack chassis 210*e* is configured to utilize to communicate. Thus, one of skill in the art in possession of the present disclosure will appreciate that the fabric management system 212 in the fabric 212 may identify every VLAN that is configured for use by the server devices 208*a*-208*d* to communicate based on the "visibility" of those VLANs on any of the downlink ports 310*a*-310*d* on each of the primary I/O modules 204*a*-204*d*/300 at block 602 (i.e., the configuration of those VLANs on server facing interfaces).

The method 600 then proceeds to block 604 where the first fabric management system automatically configures primary I/O modules using the VLAN information. In an embodiment, at block 604 and in response to identifying the VLAN information at block 602, the fabric management engine 504 in the fabric management system 212/500 may communicate via its communication system 508 with the primary I/O module engine 304 in the primary I/O modules 204*a*-204*d*/300 (e.g., via their respective management communication systems 306) in order to configure each of those primary I/O modules 204*a*-204*d*/300 using the VLAN information identified at block 602. For example, the fabric management engine 504 in the fabric management system 212/500 may operate at block 604 to automatically configure the uplink ports 308*a*-308*c* on each of the primary I/O modules 204*a*-204*d*/300 using the VLAN information identified via the downlink ports 310*a*-310*d* on those primary I/O modules 204*a*-204*d*/300 at block 602.

As such, with reference to the specific example illustrated in FIG. 2B, the fabric management engine 504 in the fabric management system 212/500 may operate at block 604 to automatically configure the uplink ports 308*a*-308*c* on the primary I/O module 204*a*/300 using the VLAN information that was identified via the downlink ports 310*a*-310*d* on that primary I/O module 204*a*/300 at block 602 and that is associated with the first VLAN configured for use in communicating by the server device 208a in the rack chassis 210b, the second and third VLANs configured for use in communicating by the server devices 208a in the rack chassis 210d, and the fourth VLAN configured for use in communicating by the server device 208a in the rack chassis 210e. As such, one of skill in the art in possession of the present disclosure will appreciate that the fabric management system 212 in the fabric 212 may configure the uplink ports 308a-308c on each of the primary I/O modules 204a-204d/300 using the VLAN information identified via the downlink ports 310a-310d on those primary I/O modules 204a-204d/300 (i.e., the secondary I/O modules may collect VLAN configuration(s) provided on a connected server, and configure corresponding VLANs on any server facing uplink interfaces).

The method 600 then proceeds to block 606 where the first fabric management system causes the VLAN information to be transmitted by the primary I/O modules to leaf switch devices. In an embodiment, at block 606, the fabric management engine 504 in the fabric management system 212/500 may communicate via its communication system 508 with the primary I/O module engine 304 in the primary I/O modules 204a-204d/300 (e.g., via their respective management communication systems 306) in order to cause the primary I/O module engine 304 in the primary I/O modules 204a-204d/300 to transmit the VLAN information to the leaf switch devices 216a-216d. For example, at block 606, the communications between the fabric management engine 504 in the fabric management system 212/500 and the primary I/O module engine 304 in the primary I/O modules 204a-204d/300 may cause the primary I/O module engines 304 to generate Link Layer Discovery Protocol (LLDP) communications that include the VLAN information that was used to configure the uplink ports 308a-308c on those primary I/O modules 204a-204d/300, and transmit those LLDP communications to their connected leaf switch device(s) 216a-216d.

The method 600 then proceeds to block 608 where a second fabric management system receives the VLAN information from the leaf switch devices. In an embodiment, at block 608, the fabric management engine 504 in the fabric management system 222/500 may communicate via its communication system 508 with the leaf switch engine 404 in the leaf switch devices 216a-216d/400 (e.g., via their respective management communication systems 406) in order to receive the VLAN information transmitted to the leaf switch devices 216a-216d/400 by the primary I/O modules 204a-204d at block 606. For example, in response to receiving VLAN information at block 606, the leaf switch engine 404 in the leaf switch devices 216a-216d/400 may generate a bitmap data structure, provide the VLAN information received at block 606 into the bitmap data structure, and transmit the bitmap data structure via its communication system 406 such that the bitmap data structure is received by the fabric management engine 504 in the fabric management system 222/500 via its communication system 508. As will be appreciated by one of skill in the art in possession of the present disclosure, the VLAN information identified at block 602 may include VLAN identifiers (e.g., 12-bit VLAN identifiers) for a relatively large number of VLANs, and thus the bitmap data structure generated by the leaf switch engine 404 in the leaf switch devices 216a-216d/400 may allow the VLAN information to be transmitted to the fabric management engine 504 in the fabric management system 222/500 in a relatively efficient manner.

The method 600 then proceeds to block 610 where the second fabric management system automatically configures the leaf switch devices using the VLAN information. In an embodiment, at block 610 and in response to receiving the VLAN information, the fabric management engine 504 in the fabric management system 222/500 may utilize the VLAN information to generate networking constructs for the downlink ports 412a-412d on the leaf switch devices 216a-216d/400. For example, one of skill in the art in possession of the present disclosure will recognize that the leaf switch devices 216a-216d/400 and spine switch devices 218a and 218b may provide a Border Gateway Protocol (BGP) Virtual Private Network (VPN)-based access network and, as such, in an embodiment of block 610 the fabric management engine 504 in the fabric management system 222/500 may utilize the VLAN information received from the leaf switch devices 216a-216d/400 to generate Virtual Extensible Local Area Network (VxLAN) information for the downlink ports 412a-412d on the leaf switch devices 216a-216d/400. The fabric management engine 504 in the fabric management system 222/500 may then communicate via its communication system 508 with the leaf switch engine 404 in the leaf switch devices 216a-216d/400 (e.g., via their respective management communication systems 406) in order to utilize that VxLAN information to configure the downlink ports 412a-412d on the leaf switch devices 216a-216d/400 to provide VxLAN access interfaces on those downlink ports 412a-412d that are connected to uplink ports 308a-308c on primary I/O modules 204a-204d/300 that were configured with the corresponding VLAN information.

The method 600 then proceeds to block 612 where the second fabric management system automatically configures communications with an Internet device using the VLAN information. In an embodiment, at block 612, the fabric management engine 504 in the fabric management system 222/500 may then communicate via its communication system 508 with the leaf switch engine 404 in the leaf switch devices 216c/400 and 216d/400 (e.g., via their respective management communication systems 406) in order to configure the uplink ports 410a-410c on those leaf switch devices 216c/400 and 216d/400 that are connected to the Internet device 220 using the VLAN information received from the leaf switch devices at block 608. Similarly as discussed above, the fabric management engine 504 in the fabric management system 222/500 may utilize the VLAN information received from the leaf switch devices to generate VxLAN information for the uplink ports 410a-410c on the leaf switch devices 216c/400 and 216d/400 that are connected to the Internet device 220.

The fabric management engine 504 in the fabric management system 222/500 may then communicate via its communication system 508 with the leaf switch engine 404 in the leaf switch devices 216c/400 and 216d/400 (e.g., via their respective management communication systems 406) in order to utilize that VxLAN information to configure the uplink ports 410a-410c on those leaf switch devices 216c/400 and 216d/400 in order to provide VxLAN access interfaces on those uplink ports 410a-410c that are connected to the Internet device 220. As will be appreciated by one of skill in the art in possession of the present disclosure, the fabric management engine 504 in the fabric management system 222/500 may utilize any of the VLAN information received from the leaf switch devices at block 608 in order to generate any Layer 2 (L2) configurations on the uplink ports 410a-410c on the leaf switch devices 216c/400 and 216d/400 that are connected to the Internet device 220 and that are needed to allow any of the server devices 208a-208d to communicate using their respective VLANs and via the Internet using the Internet device 220 (i.e., the uplink may aggregate all of the VLANs configured on the leaf switch facing ports).

Thus, systems and methods have been described that provide for the automatic configuration of VLANs across multiple fabrics/Smart Fabric Services (SFS) domains to enable server devices to communicate with each other and via the Internet. For example, the multi-fabric VLAN configuration system of the present disclosure includes a first fabric/SFS domain having a plurality of server devices that are configured to communicate using a plurality of VLANs, a primary I/O module that is coupled to the plurality of server devices, and a first SFS management system that is coupled to the plurality of server devices and the primary I/O module. The first SFS management system operates to identify VLAN information associated with the plurality of VLANs, automatically configure a plurality of primary I/O module downlink ports on the primary I/O module using the VLAN information, and cause the VLAN information to be transmitted via a plurality of primary I/O module uplink ports on the primary I/O module. The multi-fabric VLAN configuration system of the present disclosure also includes a second fabric/SFS domain having a leaf switch device that is coupled to the primary I/O module via the plurality of primary I/O module uplink ports and that is configured to receive the VLAN information, and a second SFS management system that is coupled to the leaf switch device. The second SFS management system operates to receive the VLAN information from the leaf switch device, and automatically configure a plurality of leaf switch device downlink ports on the leaf switch device using the VLAN information. As such, one of skill in the art in possession of the present disclosure will recognize how the multi-fabric VLAN configuration system of the present disclosure eliminates the time consuming, error-prone conventional manual configuration techniques to allow server device communications using VLANs and across multiple fabrics.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-fabric Virtual Local Area Network (VLAN) configuration system, comprising:
   a first fabric that includes:
      a computing device that is configured to communicate using a virtual network;
      a first fabric networking device that is coupled to the computing device; and
      a first fabric management system that is coupled to the computing device and the first fabric networking device, wherein the first fabric management system is configured to:
         identify virtual network information associated with the virtual network;
         automatically configure at least one first fabric networking device port on the first fabric networking device using the virtual network information; and
         cause the virtual network information to be transmitted by the first fabric networking device across a first fabric boundary of the first fabric; and
   a second fabric that is different than the first fabric and that includes:
      a second fabric networking device that is coupled to the first fabric networking device and that is configured to receive the virtual network information across a second fabric boundary of the second fabric; and
      a second fabric management system that is coupled to the second fabric networking device, wherein the second fabric management system is configured to:
         receive, from the second fabric networking device, the virtual network information; and
         automatically configure at least one second fabric networking device port on the second fabric networking device using the virtual network information.

2. The system of claim 1, wherein the causing the virtual network information to be transmitted by the first fabric networking device across the first fabric boundary of the first fabric includes:
   causing the virtual network information to be transmitted by the first fabric networking device across the first fabric boundary in a bitmap data structure.

3. The system of claim 1, wherein the virtual network is a Virtual Local Area Network (VLAN), and the virtual network information is VLAN information.

4. The system of claim 1, wherein the causing the virtual network information to be transmitted by the first fabric networking device across the first fabric boundary of the first fabric includes:
   causing the virtual network information to be transmitted by the first fabric networking device across the first fabric boundary of the first fabric via Link Layer Discovery Packet (LLDP) communications.

5. The system of claim 1, wherein the second fabric is a virtual fabric that utilizes a Virtual extensible Local Area Network (VxLAN).

6. The system of claim 5, wherein the automatically configuring the at least one second fabric networking device port on the second fabric networking device using the virtual network information includes providing a VxLAN configuration on the at least one second fabric networking device port.

7. The system of claim 1, wherein the automatically configuring the at least one second fabric networking device port on the second fabric networking device using the virtual network information includes:
   automatically configuring a second fabric networking device port on the second fabric networking device that is directly connected to the first fabric networking device using the virtual network information; and
   automatically configuring a second fabric networking device port on the second fabric networking device that is directly connected to a second fabric Internet device using the virtual network information.

8. An Information Handling System (IHS), comprising:
   a processing system; and
   a memory system that is coupled to the processing system and that includes instructions that, when executed by the processing system, cause the processing system to provide a fabric management engine that is configured to:
      receive, from a second fabric networking device in a second fabric that is coupled to a first fabric networking device in a first fabric that is different than the second fabric, virtual network information associated with a virtual network that is utilized by a computing device coupled to the first fabric networking device; and automatically configure at least one second fabric networking device port on the second fabric networking device using the virtual network information.

9. The IHS of claim 8, wherein the receiving the virtual network information includes:

receiving the virtual network information from the second fabric networking device in a bitmap data structure.

10. The IHS of claim 8, wherein the virtual network is a Virtual Local Area Network (VLAN), and the virtual network information is VLAN information.

11. The IHS of claim 8, wherein the second fabric is a virtual fabric that utilizes a Virtual extensible Local Area Network (VxLAN).

12. The IHS of claim 11, wherein the automatically configuring the at least one second fabric networking device port on the second fabric networking device using the virtual network information includes providing a VxLAN configuration on the at least one second fabric networking device port.

13. The IHS of claim 8, wherein the automatically configuring the at least one second fabric networking device port on the second fabric networking device using the virtual network information includes:

automatically configuring a second fabric networking device port on the second fabric networking device that is directly connected to the first fabric networking device using the virtual network information; and automatically configuring a second fabric networking device port on the second fabric networking device that is directly connected to a second fabric Internet device using the virtual network information.

14. A method for configuring virtual networks in multiple fabrics, comprising:

receiving, by a second fabric management system from a second fabric networking device in a second fabric that is coupled to a first fabric networking device in a first fabric that is different than the second fabric, virtual network information associated with a virtual network that is utilized by a computing device coupled to the first fabric networking device; and automatically configuring, by the second fabric management system, at least one second fabric networking device port on the second fabric networking device using the virtual network information.

15. The method of claim 14, wherein the receiving the virtual network information includes:

receiving the virtual network information from the second fabric networking device in a bitmap data structure.

16. The method of claim 14, wherein the second fabric is a virtual fabric that utilizes a Virtual extensible Local Area Network (VxLAN).

17. The method of claim 16, wherein the automatically configuring the at least one second fabric networking device port on the second fabric networking device using the virtual network information includes providing a VxLAN configuration on the at least one second fabric networking device port.

18. The method of claim 14, further comprising:

identifying, by a first fabric management system in the first fabric, the virtual network information;

automatically configuring, by the first fabric management system, at least one first fabric networking device port on the first fabric networking device using the virtual information; and causing, by the first fabric management system, the virtual network information to be transmitted by the first fabric networking device across a first fabric boundary of the first fabric and to the second fabric networking device in the second fabric.

19. The method of claim 18, wherein the causing the virtual network information to be transmitted across the first fabric boundary of the first fabric and to the second fabric networking device in the second fabric includes:

causing the virtual network information to be transmitted by the first fabric networking device to the second fabric networking device via Link Layer Discovery Packet (LLDP) communications.

20. The method of claim 14, wherein the automatically configuring the at least one second fabric networking device port on the second fabric networking device using the virtual network information includes:

automatically configuring a second fabric networking device port on the second fabric networking device that is directly connected to the first fabric networking device using the virtual network information; and automatically configuring a second fabric networking device port on the second fabric networking device that is directly connected to a second fabric Internet device using the virtual network information.

* * * * *

UNITED STATES PATENT AND TRADEMARK OFFICE
CERTIFICATE OF CORRECTION

| | | |
|---|---|---|
| PATENT NO. | : 11,652,692 B2 | Page 1 of 1 |
| APPLICATION NO. | : 17/500361 | |
| DATED | : May 16, 2023 | |
| INVENTOR(S) | : Rajagopalan et al. | |

It is certified that error appears in the above-identified patent and that said Letters Patent is hereby corrected as shown below:

On the Title Page

Item (72) Inventors: "Joseph Lasalle White" should read --Joseph LaSalle White--

In the Specification

Column 6, Line 33, "Operating System 10 (0510)" should read --Operating System 10 (OS10)--
Column 8, Line 11, "Operating System 10 (0510)" should read --Operating System 10 (OS10)--

Signed and Sealed this
Twenty-fifth Day of July, 2023

Katherine Kelly Vidal
*Director of the United States Patent and Trademark Office*